United States Patent
Jiang et al.

(12) 
(10) Patent No.: US 6,996,123 B1
(45) Date of Patent: Feb. 7, 2006

(54) ADAPTIVE BIT RATE TRANSPONDER

(75) Inventors: Jing W. Jiang, San Jose, CA (US);
Xiaojun Fang, Hayward, CA (US);
Robert J. Deri, Pleasanton, CA (US);
Lawrence J. Pelz, Livermore, CA (US)

(73) Assignee: Terawave Communications, Inc., Hayward, CA (US)

( * ) Notice: Subject to any disclaimer, the term of this patent is extended or adjusted under 35 U.S.C. 154(b) by 877 days.

(21) Appl. No.: 09/833,528

(22) Filed: Apr. 11, 2001

Related U.S. Application Data

(60) Provisional application No. 60/196,207, filed on Apr. 11, 2000.

(51) Int. Cl.
*H04J 3/06* (2006.01)

(52) U.S. Cl. .................... 370/465; 370/509

(58) Field of Classification Search ............ 370/252, 370/236, 408, 410, 465, 503, 507, 509, 516; 375/356, 358; 709/227, 228, 237, 248
See application file for complete search history.

(56) References Cited

U.S. PATENT DOCUMENTS

| | | | |
|---|---|---|---|
| 6,014,693 A * | 1/2000 | Ito et al. ...................... 709/219 |
| 6,075,634 A | 6/2000 | Casper et al. ................ 359/152 |
| 6,075,787 A * | 6/2000 | Bobeck et al. ............ 370/395.2 |
| 6,178,213 B1 * | 1/2001 | McCormack et al. ........ 375/355 |
| 6,292,875 B1 * | 9/2001 | Tanaka et al. ............... 711/154 |
| 6,667,991 B1 * | 12/2003 | Tzannes ...................... 370/465 |
| 2003/0043432 A1 * | 3/2003 | Marmur et al. ............. 359/152 |
| 2003/0074674 A1 * | 4/2003 | Magliaro .................... 725/118 |
| 2004/0091028 A1 * | 5/2004 | Aronson et al. ............ 375/219 |

FOREIGN PATENT DOCUMENTS

EP 702474 A1 * 3/1996
JP 2004023732 A * 1/2004

OTHER PUBLICATIONS

International Telecommunication Union, "Architecture of Optical Transports," *Series G: Transmission Systems and Media, Digital Systems and Network*, ITU-T Recommendation G.872, 31 pages, Feb. 1999.

* cited by examiner

*Primary Examiner*—Ricky Ngo
*Assistant Examiner*—Feben Haile
(74) *Attorney, Agent, or Firm*—Fenwick & West LLP

(57) ABSTRACT

A technique for communicating a change in bit rates that dependent transponders should each transfer. In one implementation, an upstream transponder outputs a specific frequency communications signal to a downstream transponders. The downstream transponder reacts to receipt of the specific bit rate by requesting new bit rate window information. The upstream transponder communicates such new bit rate window. Thereafter both the upstream and downstream transponders transfer payloads of signals having bit rates within the programmed bit rate windows.

9 Claims, 7 Drawing Sheets

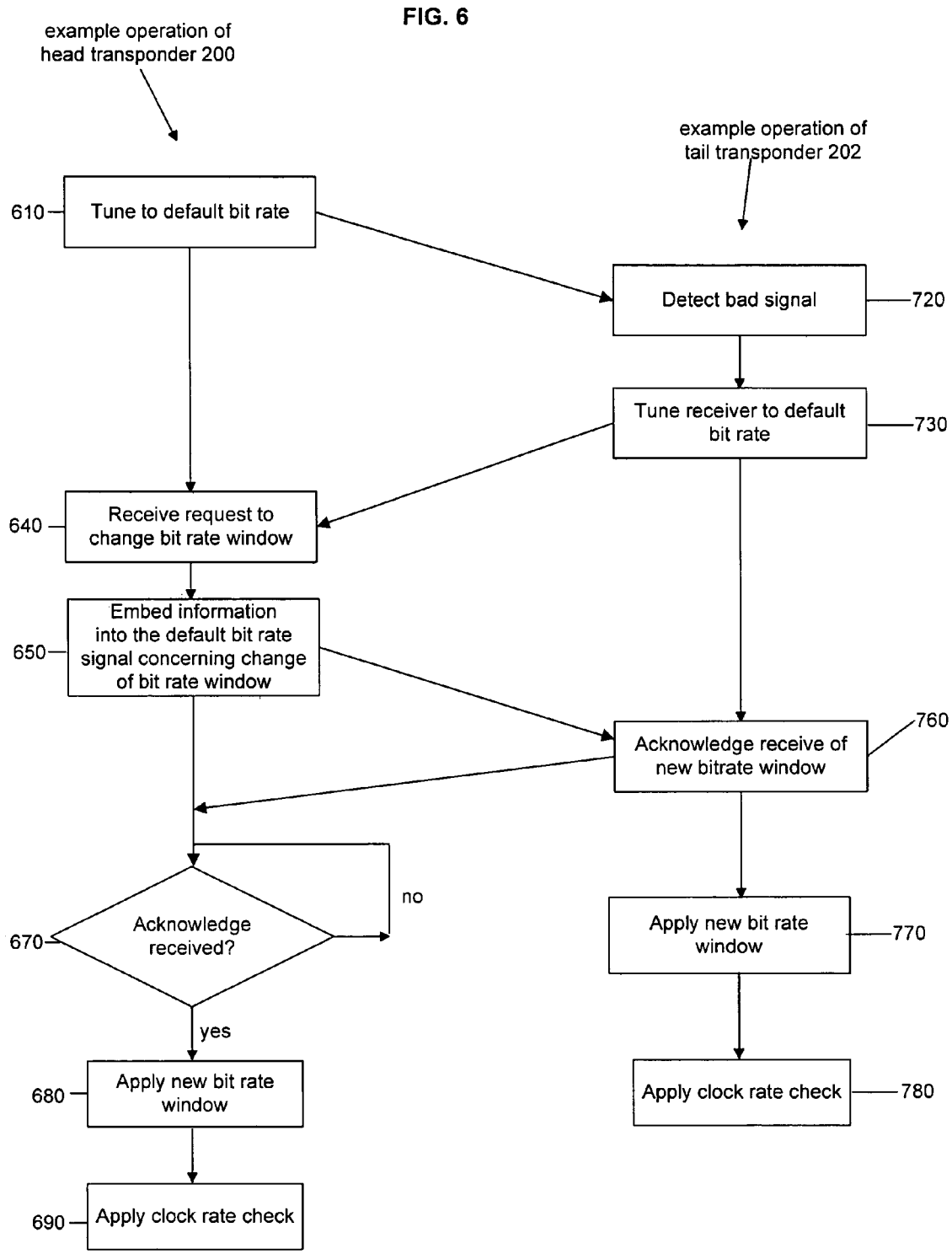

ADAPTIVE BIT RATE TRANSPONDER

CROSS REFERENCE TO RELATED APPLICATION

This application claims priority from U.S. Provisional Patent Application Ser. No. 60/196,207 filed Apr. 11, 2000, which is incorporated by reference in its entirety.

FIELD OF THE INVENTION

The present invention is directed to a transponder and more specifically to a transponder programmable to vary the transferred input signal bit rate.

RELATED ART

In communications systems, frequently it is desirable to control which signals can enter a distinct network or location. Devices known as transponders are used in such scenarios. A transponder is a device that receives an input signal, regenerates it, and then retransmits that signal. See for example, U.S. Pat. No. 6,075,634 to Casper et al. For example, FIG. 1 depicts an example in which transponder 110 couples network 120 to user 150, where user 150 is for example, a corporate office's telecommunications equipment.

One manner in which a transponder controls which signals it transfers is based on bit rate. Some transponders are programmable as to the signal bit rate transferred. For example, an optical transponder should be able to forward SONET traffic at 155, 622, and 2488 Mbs, as well as gigabit ethernet traffic at 1250 Mbs. The well-known "3R" type of transponder transfers a signal having a bit rate within a small range of bit rates. In order to use a transponder, such as the 3R transponder, a mechanism is required to set the bit rate or narrow band of bit rates of signals that the transponder transfers (so called "bit rate window"). Further, some technique is required to determine the correct bit rate window. Because transponders are often located far from a central control site, it is important to provide a technique for performing such bit rate window changes remotely.

In the example of FIG. 1, transponder 110 serves as an interface between user 150 and network 120. If the equipment of user 150 is changed so to either increase or decrease the bit rate at which user 150 receives signals from transponder 110, then the bit rate window of transponder 110 should be changed to match the appropriate signal bit rate transferred to user 150.

One approach is to configure the bit rate window of transponder 110 at installation. If the input signal's bit rate is subsequently changed, however, a field technician must be dispatched to the transponder location to readjust the bit rate. Manually adjusting bit rates is time consuming and expensive.

If the transponder can be controlled through a secondary communication link, such as the "optical service channel" on a wave division multiplexed (WDM) ring, then this channel can be used to remotely provision the bit rate window. Note that this communication typically occurs "out-of-band", i.e., on a link dedicated to communications and not carrying data. In certain scenarios, however, such as tree-architecture deployments, an optical service channel is impractical due to the point-to-multipoint nature of the architecture. Moreover, the additional optoelectronics required to implement a separate channel add significant cost to the transponder unit.

Thus what is needed is a method and apparatus that eliminates the need for labor intensive efforts and/or dedicated communications channel to establish or change a bit rate window.

SUMMARY OF THE INVENTION

One embodiment of the present invention includes a method of selecting signals to transfer between a head transponder and tail transponder, the method including the acts of: (a) tuning an applied bit rate window of a head transponder to a predetermined frequency; (b) receiving a request at the head transponder to change the bit rate window; (c) at the head transponder, generating a communications signal having a bit rate of the predetermined frequency; (d) at the head transponder, inserting a command into the communications signal, where the command states to establish a new bit rate window; (e) at the head transponder, transmitting the communications signal to a downstream element; and (f) at the head transponder, transferring payload of incoming signals having a bit rate within the bit rate window.

This embodiment can further include the acts of: (g) receiving the communications signal at the tail transponder; (h) detecting a change in input bit rate at the tail transponder; (i) at the tail transponder, generating a response signal having a similar bit rate as the communications signal; (j) at the tail transponder, inserting a command into the response signal indicating receipt of a command to set a new bit rate window; and (k) at the tail transponder, transferring to the head transponder a payload of signals having a bit rate within the bit rate window.

Various embodiments of the present invention will be more fully understood in light of the following detailed description taken together with the accompanying drawings.

BRIEF DESCRIPTION OF THE DRAWINGS

FIG. 6 is a flow diagram of exemplary operation between transponders 200 and 202.

Note that use of the same reference numbers in different figures indicates the same or like elements.

DETAILED DESCRIPTION

Figure 1:
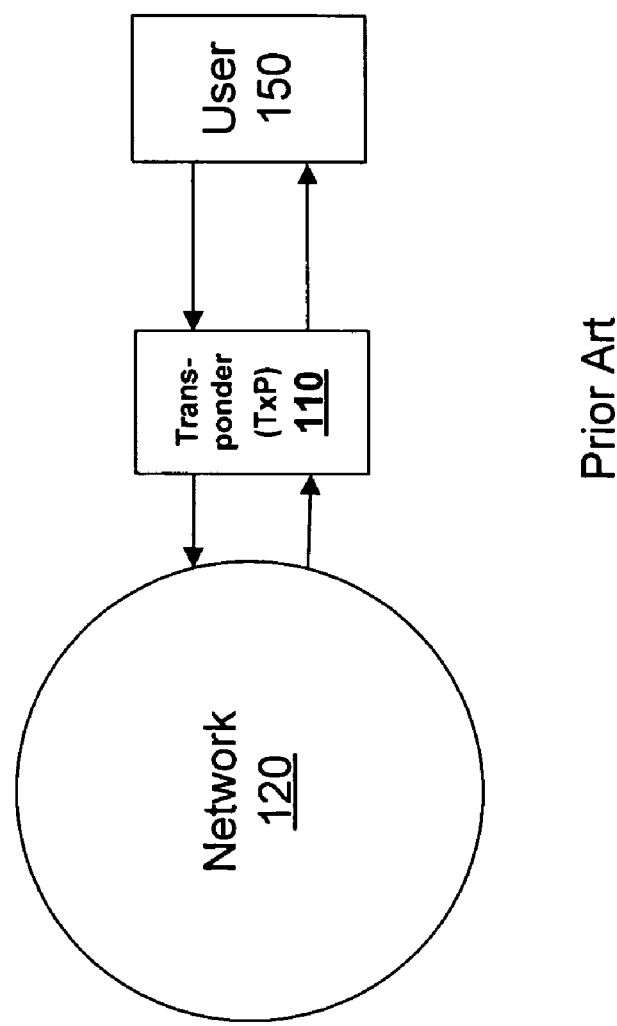
FIG. 1 depicts an example in which transponder 110 couples network 120 to user 150.
Figure 2:
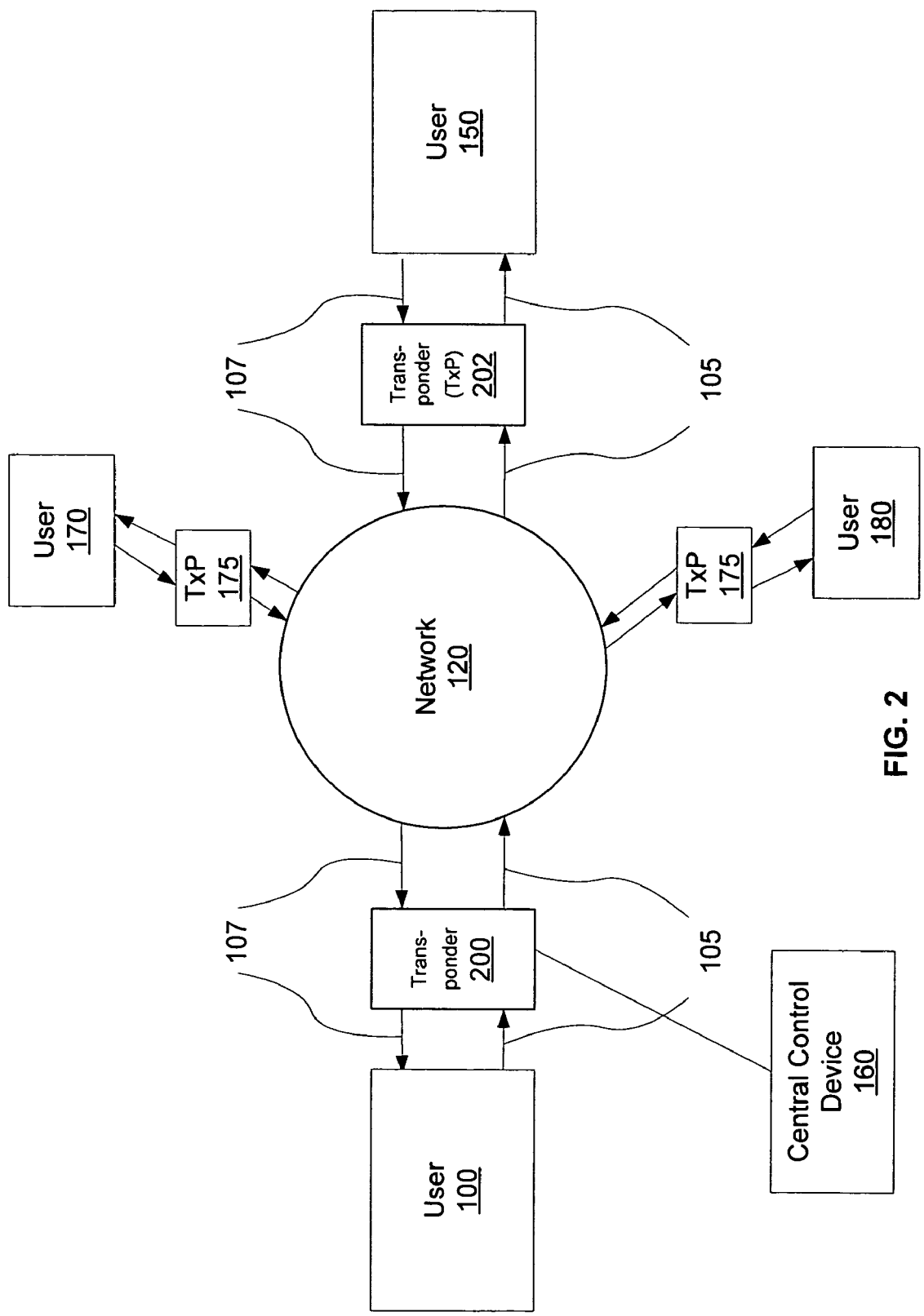
FIG. 2 depicts in block diagram form an exemplary environment in which an embodiment of the present invention can be used.

FIG. 2 depicts in block diagram form an exemplary environment in which an embodiment of the present invention can be used. Network 120 is capable of transmitting signals of varying protocols and formats (e.g., SONET, SDH, passive optical network and/or gigabit Ethernet). User 100 is coupled to network 120 using an embodiment of the present invention in transponder 200, which is described in more detail below. User 150 is coupled, for example, to network 120 by use of a transponder 202, which is a duplicate of transponder 200. In this example, users 100 and 150 represent entities that pay for use of network 120. The network 120 is capable of transmitting signals from user 100 to a variety of users, such as users 170 and 180 through respective transponders 165 and 175.

In this example, transponders 200 and 202 are respectively referred to as head and tail transponders. The head transponder transmits signals and instructions downstream to the tail transponder through network 120.

As an example, transponder 200 transfers signal 105 from user 100 to network 120. Transponder 202 transfers signal 105 from network 120 to user 150. Similarly, transponder 202 transfers signal 107 from user 150 to network 120. Transponder 200 transfers signal 107 from network 120 to user 100. Signals 105 and 107 can be encoded in any protocol (e.g., SONET, SDH, passive optical network and/or gigabit Ethernet). Herein, signal 105 refers to the signal 105 as transmitted from user 100 or generated by transponder 200 and any modifications made to signal 105 during processing or transport through transponders 200 and 202. Similarly, signal 107 refers to the signal 107 as transmitted from user 150 or generated by transponder 202 and any modifications made to signal 107 during processing or transport through transponders 200 and 202.

In this configuration, transponder 200 can be programmed externally by a central control device 160 as to the format and bit rate of signal 105 that transponder 200 transfers from user 100 to network 120. The central control device 160 may also instruct transponder 200 to insert various commands into the signal 105 or otherwise modify the signal 105. In accordance with an embodiment of the present invention, transponder 200 communicates with tail transponder 202 using the instructions inserted into signal 105. In this example, in accordance with commands inserted into overhead fields of signal 105 from transponder 200, transponder 202 selectively transfers and modifies signal 105 from network 120 to user 150. The use of commands inserted into overhead fields of signal 105 reduces the need for deployment of field technicians to change the bit rate window of tail transponder 202. An example interoperation between transponder 200 and tail transponder 202 is described with respect to FIGS. 3A to 6.

Transponder Block Diagram

Figure 3A:
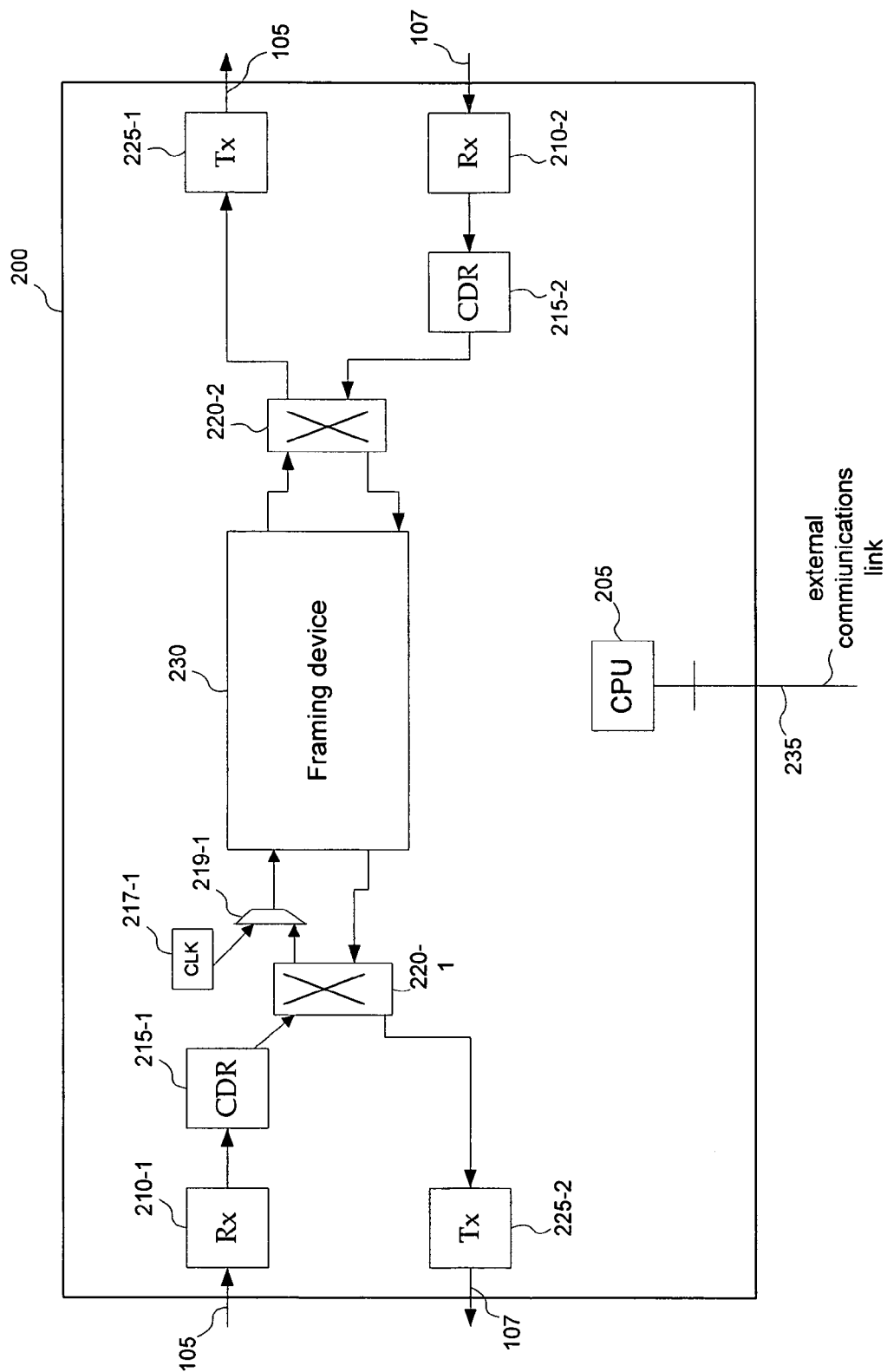
FIG. 3A depicts in block diagram form an embodiment of transponder 200.

FIG. 3A depicts in block diagram form an embodiment of transponder 200. Transponder 200 includes central processing unit (CPU) 205, receiver 210-1, clock and data recovery device (CDR) 215-1, switch 220-1, MUX 219-1, clock 217-1, framing device 230, switch 220-2, and transmitter 225-1. Receiver 210-2, CDR 215-2, and transmitter 225-2 are used when the transponder 200 processes signal 107 and thus operates in duplex mode, i.e., bi-directional signal transfer and processing, of both signals 105 and 107.

Signal 105 from user 100 is routed through transponder 200 through receiver 210-1, CDR 215-1, switch 220-1, MUX 219-1, framing device 230, switch 220-2, and transmitter 225-1. Similarly, signal 107 from user 150 is routed through transponder 200 through receiver 210-2, CDR 215-2, switch 220-2, framing device 230, switch 220-1, and transmitter 225-2.

Figure 3B:
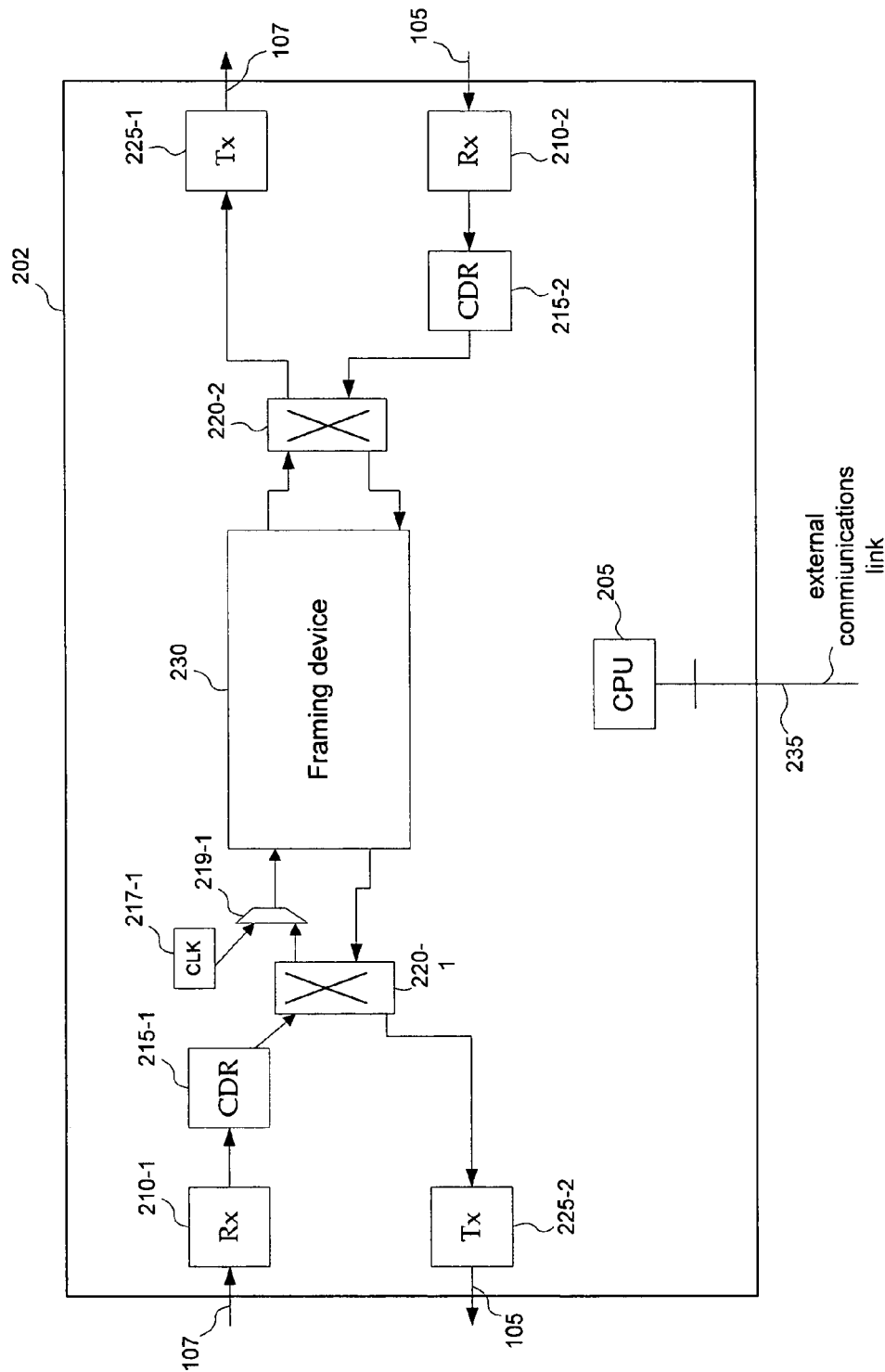
FIG. 3B depicts in block diagram form an embodiment of transponder 202.

FIG. 3B depicts in block diagram form an embodiment of transponder 202, which is similar to transponder 200. In this example, when transponder 200 and transponder 202 communicate, signal 105 is received by receiver 210-2 of transponder 202 as opposed to receiver 210-1. For the sake of clarity, description shall be provided of transponder 200 only and such description applies to transponder 202 unless otherwise stated.

Receiver 210-1 is coupled to receive signal 105 from user 100. CDR 215-1 is coupled to receive signals from receiver 210-1. Similarly, receiver 210-2 is coupled to receive signal 107 from user 150 and CDR 215-2 is coupled to receive signals from receiver 210-2. Switch 220-1 transfers (a) signals from CDR 215-1 to MUX 219-1 and (b) signals from framing device 230 to transmitter 225-2. Switch 220-2 transfers (x) signals from CDR 215-2 to framing device 230 and (y) signals from framing device 230 to transmitter 225-1.

For the sake of clarity, unidirectional operation is described with respect to signal 105 and receiver 210-1, CDR 215-1, switch 220-1, and transmitter 225-1. For bi-directional (duplex) operation, the operations of receiver 210-2, CDR 215-2, switch 220-2, and transmitter 225-2 on signal 107 are similar to those of respective receiver 210-1, CDR 215-1, and transmitter 225-1.

CPU 205 coordinates the operations of the elements of the transponder 200. Using link 235, CPU 205 communicates with, for example, a central control device 160 or field operator external to transponder 200 that directs the operations of the transponder 200. An exemplary implementation of CPU 205 is any microprocessor in the Motorola MPC 860 family.

Conventional receiver 210-1 of transponder 200 is coupled to receive signals 105 from an external device or network such as user 100. In some embodiments, signals 105 are optical signals and receiver 210-1 converts the signals 105 into electrical equivalents. Receiver is capable of converting optical signals encoded in a variety of protocols (e.g., SONET, SDH, passive optical network and/or gigabit Ethernet) at a wide range of data rates, including OC-48. An exemplary implementation of receiver 210-1 is the SDM 7128 available from Sumitomo. Receiver transfers the signal 105 to CDR 215-1.

Conventional CDR 215-1 controls whether signal 105 is transferred to switch 220-1. CDR 215-1 transfers signals within a programmable bit rate window. The CDR 215-1 provides a clock and data recovery system over a wide range data rates including OC-48. A suitable implementation of CDR 215-1 is the VSC 8123 available from Vitesse Semiconductor Corporation. U.S. Pat. No. 6,178,213 to McCormack et al., which is hereby incorporated by reference in its entirety, describes a suitable implementation of CDR 215-1. The bit rate window of CDR 215-1 is controlled by the CPU 205. CDR 215-1 selectively transfers signal 105 to switch 220-1 in accordance with the programmed bit rate window.

In some embodiments, the transponder 200 can be configured to adaptively set any bit rate window independent of the format and protocol of the signal. In some embodiments, a device external to the transponder 200, such as for example, a central controller device 160 or local field technician, sets bit rate window of the transponder 200. For example, a central controller device 160 can transmit to CPU 205 an instruction of the appropriate bit rate window and format of the signal 105 (e.g., SONET, SDH, or gigabit Ethernet) that transponder 200 will transfer.

In this embodiment, switch 220-1 transfers (a) signal 105 from CDR 215-1 to MUX 219-1 and (b) signal 107 from framing device 230 to transmitter 225-2. Switch 220-1 is any conventional signal routing device that has the bit rate transfer capacity to bi-directionally transfer signals without significant delay. A suitable implementation of switch 220-1 is the S3054 available from Applied Micro Circuits Corporation (AMCC). Switch 220-1 can also be capable of loopback operation, e.g., transferring signals from CDR 215-1 to transmitter 225-2.

MUX 219-1 is any conventional multiplexer and is coupled to receive (a) the signal 105 from switch 220-1 and (b) a clock signal from clock 217-1. Clock 217-1 generates a clock signal having a frequency set to be a distinct communications channel between transponders 200 and 202. The output of MUX 219-1 is coupled to framing device 230 and is selected by CPU 205. Signal 105 refers to either the clock signal or the signal 105 from user 100 unless otherwise stated. In this embodiment, MUX 219-1 transfers the signal 105 from switch 220-1 to framing device 230 except when transponder 200 attempts to establish the bit rate window of both transponders 200 and 202.

In this embodiment, clock signal from clock 217-1 is an "in-band" control signal, i.e., it is transmitted using a link dedicated to communications. Advantageously, use of an "in-band" clock signal as a communications channel avoids the added cost of an optical service channel, which requires a separate wavelength (and hence additional wavelength filters), plus separate transmitters and receivers.

Figure 4:
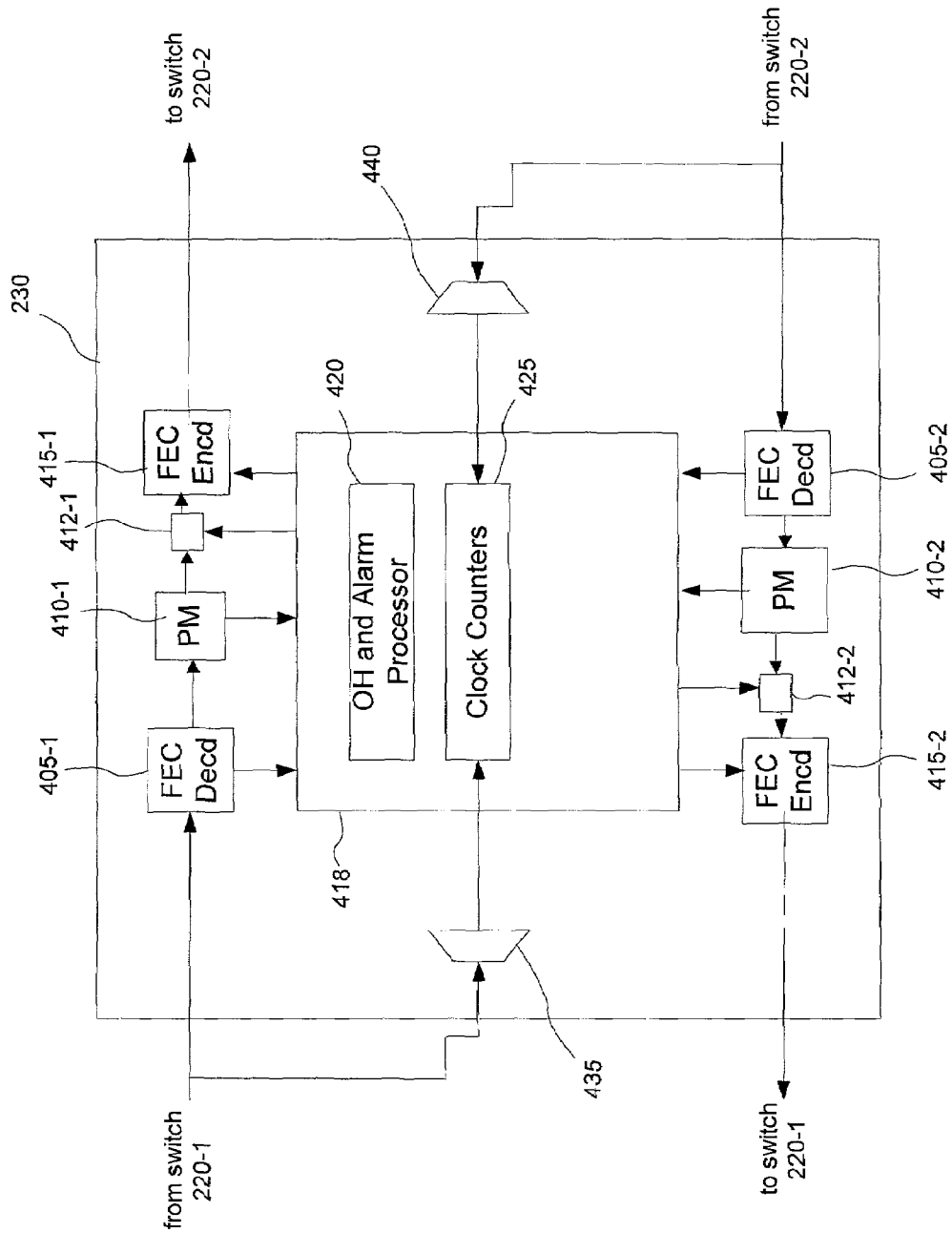
FIG. 4 depicts, in block diagram form, framing device 230 that is in accordance with an embodiment of the present invention.

FIG. 4 depicts, in block diagram form, framing device 230 that is in accordance with an embodiment of the present invention. In some embodiments, framing device 230 supports embedded payload data and signal performance assessment for at least SONET/SDH and 8B10B encoded data. Framing device 230 includes controller 418, FEC decoder 405-1, performance monitor (PM) 410-1, gate 412-1, FEC encoder 415-1, FEC decoder 405-2, performance monitor (PM) 410-2, gate 412-2, and FEC encoder 415-2. For transponder 200, FEC decoder 405-1, performance monitor (PM) 410-1, gate 412-1, and FEC encoder 415-1 are used to process signal 105 whereas FEC decoder 405-2, performance monitor (PM) 410-2, gate 412-2, and FEC encoder 415-2 are used to process signal 107. For transponder 202, FEC decoder 405-1, performance monitor (PM) 410-1, gate 412-1, and FEC encoder 415-1 are used to process signal 107 whereas FEC decoder 405-2, performance monitor (PM) 410-2, gate 412-2, and FEC encoder 415-2 are used to process signal 105. The operations of FEC decoder 405-1, performance monitor (PM) 410-1, gate 412-1, and FEC encoder 415-1 are similar to those of respective FEC decoder 405-2, performance monitor (PM) 410-2, gate 412-2, and FEC encoder 415-2. For the sake of clarity, the operations of FEC decoder 405-1, performance monitor (PM) 410-1, gate 412-1, and FEC encoder 415-1 are described herein.

Framing device 230 can be implemented as software executed by CPU and/or firmware. Framing device 230 is capable of processing bi-directional bit streams (e.g., signals 105 and 107) without substantial delay. FEC decoder 405-1 is coupled to receive signal 105 from MUX 219-1. FEC decoder 405-1 outputs signal 105 to PM 410-1 and provides the overhead fields from signal 105 to processor 420 of controller 418. PM 410-1 outputs signal 105 to gate 412-1 and provides payload data performance information concerning signal 105 to processor 420 (which will be sent to CPU 205). Gate 412-1 transfers the overhead fields of signal 105 to FEC encoder 415-1 but selectively transfers the data payload of signal 105 to FEC encoder 415-1. Controller 418 controls whether gate 412-1 transfers the data payload of signal 105 to FEC encoder 415-1. FEC encoder 415-1 provides commands embedded in signal 105 to processor 420 and provides signal 105 to switch 220-2. FEC decoder 405-1, PM 410-1 and FEC encoder 415-1 can be implemented using a single AMCC S3062 available from Applied Micro Circuits Corporation.

In one embodiment, if signal 105 includes forward error correction (FEC) encoding, FEC decoder 405-1 applies Reed-Solomon FEC decoding in compliance with ITU standard G.709. For a description of Reed-Solomon FEC, see ITU G.709 and G.975, which is hereby incorporated by reference in its entirety. FEC decoder 405-1 provides the FEC decoded signal 105 to PM 410-1 and provides overhead fields (e.g., optical overhead channel (OCH)) from the signal 105 to controller 418.

PM 410-1 performs optical channel payload data protocol performance monitoring on signal 105 in accordance with the relevant protocol of signal 105. Exemplary protocols include BellCore's GR.253 standard relating to SONET or 8B10B encoding. PM 410-1 provides signal 105 to gate 412-1 and provides optical channel payload data performance results to controller 418.

In this embodiment, controller 418 performs frame synchronization on signal 105 and counts the bit rate of signal 105. FIG. 4 depicts a detailed diagram of controller 418. As depicted, controller 418 includes clock counter 425 and overhead (OH) and alarm processor 420. Controller 418 is coupled to receive: (a) OCH OH bits from FEC decoder 405-1, (b) optical channel payload data protocol performance results from PM 410-1, and (c) commands embedded in signal 105 from FEC encoder 415-1.

Overhead and alarm processor 420 is coupled to receive the signal 105 from PM 410-1. Processor 420 performs frame synchronization to determine the start of each frame of the signal 105 in accordance with the relevant signal protocol. For example, when signal 105 is transmitted using the optical transport network (OTN) architecture defined in ITU recommendation G.872 or SONET, framing device 230 identifies each "frame" within the signal including the overhead fields.

In addition, processor 420 identifies any commands embedded within the overhead fields or other information carrying fields of signal 105. As described in more detail below, overhead fields of signal 105 may include commands directed to transponder 202. An exemplary command is for transponder 202 to set a new bit rate window. When transponder 202 acts as a tail transponder, processor 420 embeds an acknowledgement of receiving a command to establish a new bit rate window signal into the overhead fields of signal 107 and transmits such signal to transponder 200. Processor 420 forwards embedded commands or messages to CPU 205 for processing.

Clock counter 425 is coupled to receive signal 105 from switch 220-1. FIG. 4 depicts, as an example, a configuration whereby a demultipexer 435 is coupled to receive the signal 105 from switch 220-1. Demultiplexer 435 is used to decrease the bit rate of signal 105 and thus allows for the use of a clock counter 425 that does not count as fast as the bit rate of signal 105. For example, the demultiplexer 435 may divide the data rate by 16 and output the slower data rate to clock counter. Clock counter 425 counts the bit rate of signal 105. In some embodiments, the clock counter 425 counts the bit rate every second although the period in which bit rates are measured can be varied.

The clock counter 425 outputs the bit rate of the signal 105 to CPU 205. CPU 205 determines whether the correct bit rate window is being applied by CDR 215-1. If the correct bit rate window is being applied by CDR 215-1, then CPU 205 commands gate 412-1 to transfer the data payload portion of signal 105 to FEC encoder 415-1. Gate 412-1 is any conventional signal gating element controlled by a signal from an external device. In this embodiment of the present invention, the controller 418 determines if CDR 215-1 transfers the correct bit rate because exemplary implementations of the CDR, such as the VSC 8123 from Vitesse Semiconductor Corporation, do not accurately determine the bit rate of incoming signals.

Figure 5:
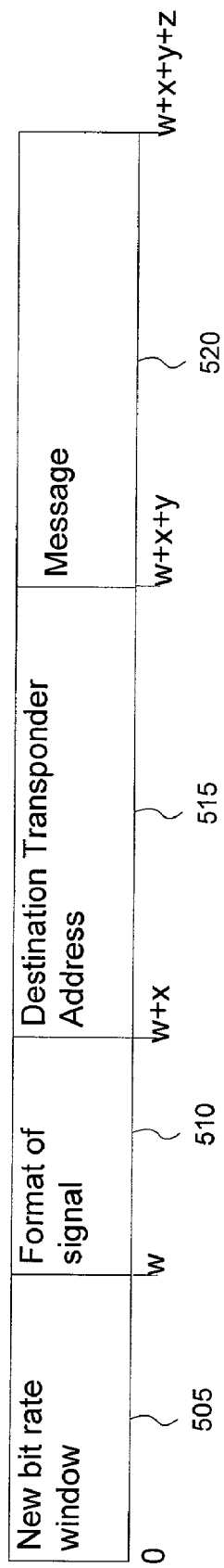
FIG. 5 depicts an exemplary overhead bit format for communicating to the downstream network element.

In some embodiments of the present invention, the framing device 230 utilizes the overhead fields of signal 105 to communicate to downstream network elements, such as transponder 202, to transfer a different signal bit rate. In this embodiment, FIG. 5 depicts an exemplary overhead bit format for communicating to the downstream network element. As shown in FIG. 5, the transponder 200 transmits (a) the new bit rate window that transponder 202 is to transfer and/or modify (shown as item 505), (b) the format of the signal (e.g., SONET, SDH, or gigabit Ethernet) (shown as item 510), (c) the identification of the tail transponder 202 that is to obey the command (shown as item 515), and (d) at least one message or instruction (e.g., (i) set new bit rate window or (ii) acknowledge receipt of instruction to set new bit rate window) (show as item 520). The bit length of each field (a), (b), (c), and (d) is arbitrary and are represented respectively as w-1, w+x-1, w+x+y-1, and w+x+y+z-1 bits. For example, when the signal 105 is encoded using OTN as defined in ITU G.872, unused bytes of the optical channel section layer (OCH) can be used to transmit the information of FIG. 5. In this embodiment, processor 420 commands FEC encoder 415-1 to insert the information described with respect to FIG. 5 and generated by processor 420 into the overhead fields of signal 105.

Referring to FEC encoder 415-1 of framing device 230, FEC encoder 415-1 is coupled to gate 412-1 to receive (a) the data payload of signal 105, if the gate 412-1 is instructed so by CPU 205, and (b) the overhead fields of signal 105. If CPU 205 does not instruct gate 412-1 to transmit the data payload of signal 105, then dummy information are transferred as the data payload of signal 105. FEC encoder 415-1 performs conventional FEC encoding. FEC encoder 415-1 provides signal 105 to switch 220-2.

Framing device 230 can be used to process bi-directional signals 105 and 107 without significant delays. For example, to process signal 107 from user 150, the FEC decoder 405-2, PM 410-2, gate 412-2, and FEC encoder 415-2 are used and operate similarly as respective FEC decoder 405-1, PM 410-1, gate 412-1, and FEC encoder 415-1. As depicted, a demultiplexer 440 can be used to couple signal 107 from switch 220-2 to clock counter 425. Demultiplexer 440 is used to decrease the bit rate of signal 107 and thus allows for the use of a clock counter 425 that does not count as fast as the bit rate of signal. For example, the demultiplexer 440 may divide the data rate by 16 and output the slower data rate to clock counter.

Switch 220-2 is a duplicate of switch 220-1. Switch 220-2 transfers (a) signal 107 from CDR 215-2 to framing device 230 and (b) signal 105 from framing device 230 to transmitter 225-1.

Transmitter 225-1 converts the electrical signal 105 into optical form. An exemplary embodiment of transmitter 225-1 is the C48 DWDM transmitter available from Lucent Technologies. In transponder 200, transmitter 225-1 outputs the signal 105 to network 120. In transponder 202, transmitter 225-1 outputs the signal 107 to network 120.

Example Operation

FIG. 6 depicts a flow diagram of a suitable interoperation between transponders 200 and 202 in accordance with an embodiment of the present invention. The example of FIG. 6 is used to establish or re-establish a bit rate window or other communication between head transponder 200 and tail transponder 202. In FIG. 6, actions having associated numbers within the 600's are operations by head transponder 200 whereas actions numbered in the 700's are operations by tail transponder 202. In this example, actions 610, 720, 730, 640, 650, 760, and 670 are a sequence.

In action 610, head transponder 200 outputs a signal having a bit rate that is recognized by the target tail transponder 202 as an attempt to establish a communications link. The clock signal is set at any bit rate identifiable by transponders 200 and 202 as a communications link. Hereafter "communications signal" means the signal having a bit rate that is recognized by the target tail transponder 202 as a communications link. For example, action 610 can include the following sub actions: (a) CPU 205 commands MUX 219-1 to output the clock signal from clock 217-1; (b) transmitter 225-1 transmits the clock signal (i.e., communications signal) as signal 105 to tail transponder 202.

In action 720, tail transponder 202 determines that it is receiving a signal having a bit rate outside of its applied bit rate window. For example, this action 720 can include the following sub actions: (a) receiver 210-2 of tail transponder 202 receives the communications signal from head transponder 200; (b) CDR 215-2 of tail transponder 202 recognizes that the signal received by receiver 210-1 is not of a bit rate within a programmed bit rate window; and (c) CDR 215-2 of tail transponder 202 communicates the failure to CPU 205.

In action 730, tail transponder 202 adjusts the applied bit rate window to receive the communications signal. For example, this action 730 can include the following sub actions: (a) in response to the communicated bit rate failure of action 720, CPU 205 commands CDR 215-2 to change its programmed bit rate window to that which includes the bit rate of the communications signal; (b) CDR 215-2 changes its programmed bit rate window in response to the command from CPU 205; (c) CPU 205 commands MUX 219-1 to output the clock signal from clock 217-1 as signal 107. Subaction 730-c is used to establish a communications/response signal to head transponder 200.

In action 640, head transponder 200 receives a request from an external person or device to change its applied bit rate window. For example, this action 640 can include the following sub actions: (a) CPU 205 receives a request from central controller 160 to change its applied bit rate window; (b) CPU 205 instructs CDR 215-1 to change its bit rate window to that specified by central controller 160; and (c) CDR 215-1 changes its bit rate window to that specified by CPU 205.

In action 650, head transponder 200 embeds information into the communications signal concerning the change of bit rate window, set by an external person or device. For example, this action 650 can include the following sub actions:

(a) the framing device 230 embeds into the signal 105 the information described with respect to FIG. 5 earlier to instruct tail transponder 202 that the applied bit rate window will change; and (b) the transmitter 225-1 transmits such signal 105 to the transponder 202 using network 120.

In action 760, tail transponder 202 acknowledges receipt of the new bit rate window. For example, this action 760 can include the following sub actions: (a) CPU 205 commands processor 420 to embed an acknowledgement of new bit rate window signal into the signal 107; (b) processor 420 provides the acknowledgement of new bit rate window message to FEC encoder 415-1 for embedding into the overhead fields of signal 107; and (c) transmitter 225-2 transmits signal 107 having the acknowledgement to transponder 200 through network 120.

In action 670, head transponder 200 waits for receipt of an acknowledgement signal from tail transponder 202. For example, this action 670 can include the following sub actions: (a) processor 420 transfers the acknowledge message from tail transponder 202 to CPU 205; (b) CPU 205 reads the acknowledgement message. If head transponder 200 does not receive an acknowledge signal from tail transponder 202, this action 670 repeats.

For head transponder 200, actions 680 and 690 follow. For tail transponder 202, actions 770 and 780 follow. Actions 680 and 690 are similar to respective actions 770 and 780. In actions 680 and 770, respective transponders 200 and 202 apply the new bit rate window on respective incoming signals 105 and 107 from respective users 100 and 150. For example, this action 680 can include the following sub actions within transponder 200: (a) CPU 205 commands CDR 215-1 to change its bit rate window; (b) CDR 215-1 applies the new bit rate window and transfers signals 105 from user 100 having a bit rate within the bit rate window through switch 220-1, MUX 219-1, FEC decoder 405-1 and PM 410-1 to gate 412-1; (c) clock counter 425 counts the bit rate of signal 105 and transfers the bit rate to CPU 205; (d) CPU 205 verifies that the bit rate of signal 105 is within the programmed bit rate window; (e) if the bit rate of signal 105 is within the programmed bit rate window, CPU 205 commands gate 412-1 to transfer the payload of signal 105 to FEC encoder 415-1; and (f) transmitter 225-1 transfers the signal 105 to tail transponder 202. If the bit rate of signal 105 is not within the programmed bit rate window, then the transponder 200 does not transmit the payload of signal 105 but rather dummy frames. Note that previously, until action 680-e, gate 412-1 does not transfer the payload of any input data but rather empty (dummy) frames are transmitted to transponder 202. For transponder 202, action 770 is similar to that of action 680.

In actions 690 and 780, respective transponders 200 and 202 verify that the bit rate of respective signals 105 and 107 are within the programmed bit rate windows. For example, this action 690 can include the following sub actions: (a) CPU 205 verifies that the bit rate of signal 105 is within the programmed bit rate window; (b) if the bit rate of signal 105 is within the programmed bit rate window, CPU 205 commands gate 412-1 to transfer the payload of signal 105 to FEC encoder 415-1; and (c) transmitter 225-1 transfers the signal 105 to tail transponder 202. If the bit rate of signal 105 is not within the programmed bit rate window, then the transponder 200 does not transmit the payload of signal 105 but rather dummy frames. For transponder 202, action 780 is similar to that of action 690.

Subsequently, transponders 200 and 202 can communicate using overhead fields of signals 105 and 107 to verify that the correct bit rate windows are being applied by both transponders 200 and 202. For example, (a) using overhead fields of signal 105 and the fields described with respect to FIG. 5, transponder 200 can query transponder 202 whether transponder 202 is successfully applying a bit rate window and (b) transponder 202 responds using overhead fields of signal 107 and the fields described with respect to FIG. 5. Transponder 202 can similarly communicate with transponder 200 to determine that transponder 200 is successfully applying a bit rate window.

Modifications

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A transponder that communicates to at least one downstream network element, the transponder comprising:
   a clock and data recovery unit ("CDR") coupled to receive the inbound signal, wherein the bit rate window of the CDR is programmable;
   a communications signal generator that generates a communications signal;
   a multiplexer ("MUX") coupled to receive the communications signal from the communications signal generator and coupled to receive the inbound signal from the CDR and that transfers either the communications signal or the inbound signal (hereafter "transferred signal" refers to either the communications signal or the inbound signal);
   a central processing unit ("CPU") coupled to the MUX and that controls which signal the MUX transfers, wherein the CPU programs the bit rate window of the CDR in response to a command external to the transponder that indicates to change the transponder bit rate window;
   a framing device coupled to receive the transferred signal from the MUX, wherein the framing device embeds a message into the communications signal and such message is directed to the at least one downstream network element; and
   a transmitter coupled to receive the transferred signal from the framing device and that transmits the transferred signal to the downstream network element.

2. A transponder that communicates to at least one downstream network element, the transponder comprising:
   a clock and data recovery unit ("CDR") coupled to receive the inbound signal, wherein the bit rate window of the CDR is programmable;
   a communications signal generator that generates a communications signal;
   a multiplexer ("MUX") coupled to receive the communications signal from the communications signal generator and coupled to receive the inbound signal from the CDR and that transfers either the communications signal or the inbound signal (hereafter "transferred signal" refers to either the communications signal or the inbound signal);
   a central processing unit ("CPU") coupled to the MUX and that controls which signal the MUX transfers;
   a framing device coupled to receive the transferred signal from the MUX, wherein the framing device embeds a message into the communications signal and such message is directed to the at least one downstream network element wherein the framing device further comprises,
   a processor device coupled to receive the transferred signal from the MUX, wherein the processor device recognizes messages embedded in the transferred signal and outputs the messages to the CPU, and a clock counter coupled to receive the transferred signal from the MUX, wherein the clock counter counts the bit rate of the transferred signal and outputs the bit rate to the CPU; and a transmitter coupled to receive the transferred signal from the framing device and to transmit the transferred signal to the downstream network element.

3. A transponder that communicates to at least one downstream network element, the transponder comprising:

a clock and data recovery unit ("CDR") coupled to receive the inbound signal, wherein the bit rate window of the CDR is programmable;

a communications signal generator that generates a communications signal;

a multiplexer ("MUX") coupled to receive the communications signal from the communications signal generator and coupled to receive the inbound signal from the CDR and that transfers either the communications signal or the inbound signal (hereafter "transferred signal" refers to either the communications signal or the inbound signal);

a central processing unit ("CPU") coupled to the MUX and that controls which signal the MUX transfers;

a framing device coupled to receive the transferred signal from the MUX, wherein the framing device embeds a message into the communications signal and such message is directed to the at least one downstream network element wherein the framing device comprises a switch coupled to receive the transferred signal from the MUX and that selectively outputs the transferred signal to the transmitter and wherein the CPU commands the switch to transfer a data payload portion of the transferred signal to the transmitter if the counted bit rate is within the programmed bit rate window of the transponder; and a transmitter coupled to receive the transferred signal from the framing device and to transmit the transferred signal to the downstream network element.

4. A transponder coupled to receive inbound signals from at least one upstream network element and those outbound signals from at least one downstream network element, wherein the inbound signals include messages from the at least one upstream network element, the transponder comprising:

a clock and data recovery unit ("CDR") coupled to receive the inbound signal, wherein a bit rate window of the CDR is programmable and wherein the CDR determines whether the bit rate of the inbound signal is within the bit rate window;

a communications signal generator that generates a first communications signal;

a multiplexer ("MUX") coupled to receive the first communications signal from the communications signal generator and coupled to receive the outbound signal and that transfers either the first communications signal or the outbound signal (hereafter "transferred signal" refers to either the first communications signal or the outbound signal);

a central processing unit ("CPU") coupled to the MUX and that controls which signal the MUX transfers and that is further coupled to the CDR to program the bit rate window;

a framing device coupled to receive the transferred signal from the MUX and the inbound signal from the CDR, wherein the framing device detects messages embedded in the inbound signal; and a transmitter coupled to receive the transferred signal from the framing device and that transmits such transferred signal to the at least one upstream network element; wherein if CDR detects the bit rate of the inbound signal is not within a programmed bit rate window, the CPU commands the CDR to change its bit rate window to include a communications frequency.

5. The transponder of claim 4, wherein the MUX transfers the first communications signal to the framing device, wherein the first communications signal is a similar frequency as the inbound signal;

the framing device embeds a message into the first communications signal that acknowledges receipt of the inbound signal; and the transmitter transfers the first communications signal to the at least one upstream network element.

6. The transponder of claim 4, wherein:

the transponder receives a second communications signal from the at least one upstream network element having a message embedded that specifies a new bit rate window to apply;

the framing device recognizes the message embedded in the second communications signal and outputs the message to the CPU, wherein the message specifies a new bit rate window for the transponder to apply; and the CPU commands the CDR to change its bit rate window to that specified in the message.

7. The transponder of claim 4, wherein the framing device further comprises:

a processor device coupled to receive the first communications signal from the MUX and further coupled to receive the inbound signal from the at least one upstream network element, wherein the processor device embeds messages into the first communications signal in response to commands from the CPU and wherein the processor device recognizes the message embedded in the second communications signal and outputs the message to the CPU; and an encoder device coupled to receive the first communications signal from the MUX and coupled to receive messages from the processor device, wherein the encoder device embeds the messages from the processor device into the first communications signal.

8. The transponder of claim 4, wherein the framing device comprises a switch coupled to receive the transferred signal from the MUX and that selectively transfers the transferred signal to the transmitter and wherein the clock counter transfers a counted bit rate of the transferred signal to the CPU;

the CPU commands the switch to transfer a data payload portion of the transferred signal to the transmitter if the counted bit rate is within the bit rate window.

9. The transponder of claim 7, wherein the message allows for the transponder to communicate with the at least one upstream network element.

* * * * *